No. 856,080. PATENTED JUNE 4, 1907.
E. B. MEYROWITZ.
EYEGLASSES.
APPLICATION FILED OCT. 3, 1905.
Fig. 1.
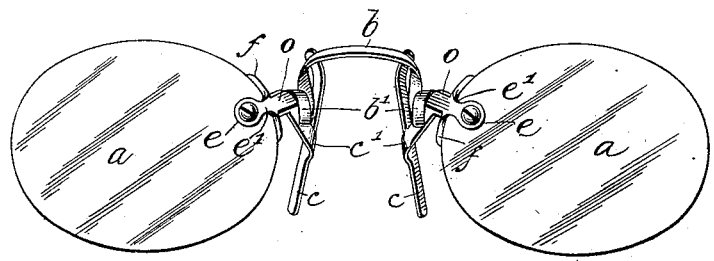
Fig. 2.
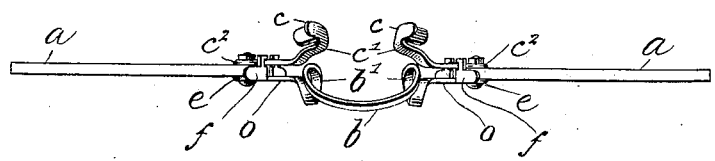
Fig. 5.
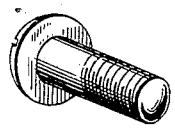
Fig. 3.
Fig. 7.
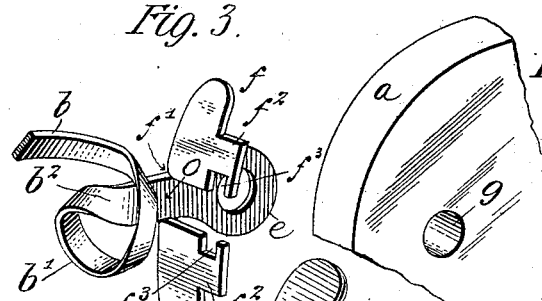
Fig. 8.
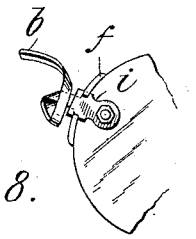
Fig. 4.
Fig. 9.
Fig. 6.
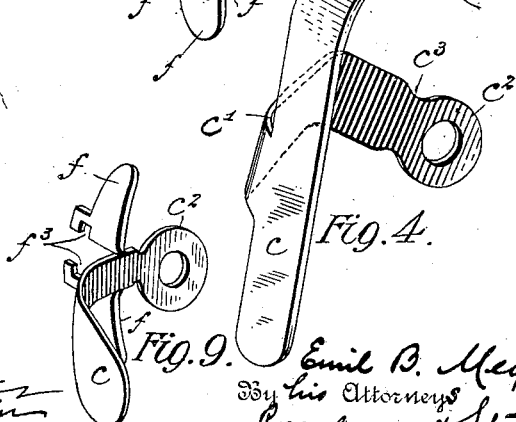
Witnesses
Inventor
Emil B. Meyrowitz
By his Attorneys
Rosenbaum + Stockbridge

UNITED STATES PATENT OFFICE.

EMIL B. MEYROWITZ, OF NEW YORK, N. Y.

EYEGLASSES.

No. 856,080.

Specification of Letters Patent.

Patented June 4, 1907.

Application filed October 3, 1905. Serial No. 281,110.

*To all whom it may concern:*

Be it known that I, EMIL B. MEYROWITZ, a citizen of the United States, residing at the city of New York, in the borough of Manhattan and State of New York, have invented certain new and useful Improvements in Eyeglasses, of which the following is a full, clear, and exact description.

This invention relates to eyeglasses and spectacles and has special reference to the mountings of the same.

The object of the invention is to produce a mounting simple and cheap in construction, unobtrusive and ornamental and which affords easy means for adjusting the spring, the guards and the pupilary distance.

In carrying out my invention I have designed a construction wherein the usual "post" is eliminated, the end of the spring and the projection from the guard being merged directly into the respective straps which embrace the edge of the lens and which are then held by a single screw passing through the straps and lens in the ordinary manner.

Another feature of my invention is in the peculiar shape given to the terminals of the spring, whereby any adjustment necessary to fit the nose of the wearer can be made, and whereby adjustment of one condition can be effected without interfering with an adjustment for another condition. The shape of the spring at the same time, is such as to afford the necessary pressure of the guards against the nose regardless of any adjustment that may be made in the various parts.

The invention will be described in detail in connection with the accompanying drawing, wherein:

Figure 1 is a front elevation of a pair of eyeglasses with mountings constructed according to my invention; Fig. 2 is an enlarged plan of the same; Fig. 3 is an enlarged detail of the end of the spring and one of the straps; Fig. 4 is an enlarged view of the guard; Figs. 5 and 6 show the fastening screw and nut; Fig. 7 the edge of the lens with the hole through which the fastening screw passes; Fig. 8 a detail of a modification of the invention; and Fig. 9 a modification.

The lenses of the glasses are indicated by $a, a$; the spring by $b$ and the two guards which grip the nose by $c, c$. The spring is preferably of that type which stands either in a horizontal plane projecting forward, or in an oblique plane projecting forward from the nose of the wearer and with its flattened portion or bridge standing approximately vertical. The invention, however, is not confined to this form of spring, since, as will be seen hereinafter, a spring which stands in a vertical plane may be used. The terminals of the spring are each provided with a curve or volute $b'$, the end of the spring from the point where the bridge portion terminates leading downward, then forward and upward and then backward, to form a loop whose sides are in a plane substantially vertical and at right angles to the plane of the lenses. After this the end of the loop indicated by $o$ is bent, as indicated at $b^2$, and leads directly laterally in a direction substantially parallel to the face of the lens. Its extremity merges into one of the straps $e$ which embrace the edge of the lens, it being given the usual circular perforated end and contracted neck $e'$. This lateral extension of the end of the spring is also preferably provided with the bracing wings $f$ adapted to rest against the curved edge of the lens and which are formed by stamping them integrally with the strap portion out of sheet metal and then bending them at right angles to the strap at the point $f'$, as clearly seen in Fig. 3, to rest against the edge of the lens. These wings are also shaped with shoulders $f^2$ having notches $f^3$ facing each other and lying in a plane back of the rear face of the lens.

The second strap, which is complementary to the strap $e$, is a separate piece from the part above described, but is preferably formed integral with the arm that supports the guard. In Fig. 4 the guard $c$ is shown provided with one of the usual forms of supporting arm $c'$, the extremity of which is formed into a strap $c^2$ having the perforation for the fastening screw and the reduced neck $c^3$. This strap is adjusted to the lens by passing it through the two notches $f^3$ in the wings $f$ so that its edge will be embraced and held by said notches. When thus placed in position it will be seen that by passing the usual screw, such as shown in Fig. 5, through the ends of the strap $e$ and $c^2$ and through the hole $g$ in the lens, the spring, the guard and the lens will all be firmly secured together. The wings $f$ will rest as usual against the curved edge of the lens and prevent vertical swinging of the latter upon the screw as a pivot and the guard will be prevented from independent movement by the support afforded by the notches $f^3$. Thus the entire mounting will be securely fastened to the edge of each lens by means of a single screw, which may, for additional security, be fitted with the nut shown in Fig. 6 on the rear face.

For the purpose of obtaining a complete mounting, it is evident that the guard need not be integrally formed with the strap. As shown in Fig. 8 the strap $i$ is merely long enough to project through the notches $f^3$ and there terminates. With such a construction the guard may be attached in any way most convenient. It will also be seen on referring to Fig. 9 that the wings $f$ may be formed integrally with the guard instead of with the spring, in which case the projecting portions $o$ at the extremities of the spring would pass through the notches and be braced by the guard portion instead of the reverse. This figure also shows another form of guard, various modifications of which may be used with my mounting.

It will be seen that with a spring shaped as illustrated and described, the various adjustments which opticians commonly make to fit the glasses upon the nose of the wearer, may be readily accomplished. The spring can be given any curvature to bring the guards nearer together or farther apart without changing the angular relation of the lens. That is to say, the spring can be bent as much as desired in any direction without changing the position of the lateral end pieces which merge into the strap, or, if such position is changed, it can be readily bent back while the other parts are held fixedly with the pliers. The lateral extensions $o$ of the ends of the spring are an important feature of the mounting, since by holding the bottom of the loop in the pliers, the extensions can be drawn outward or forced inward to increase or decrease the pupilary distance, and this it will be seen can be done without spreading or contracting the spring. The mounting of the guard likewise permits of the freest adjustment. The guard itself can be bent in any manner to fit the side of the nose and the arm $c'$ supporting it can likewise be bent either to separate or approach the guards. This freedom of adjustment is largely afforded by the fact that the spring portion of the mounting comprises three sections so related to each other that any one of them can be placed or displaced without affecting the others. These three sections may be understood as comprising the bridge portion of the spring, the volute and the laterally extending terminal. It will be seen that the terminal can be drawn outward, forced inward or bent in any direction without disturbing the volute; likewise the volute can be tilted or curled without affecting the terminal or the spring, and the spring can be arched or flattened to bring the guards together or separate them and the pupilary distance then readjusted by means of the terminal portion.

It will be seen that the entire mounting comprises only three pieces, exclusive of the screws and that only two of the latter are required. The merit of the invention resides in the universal adjustability afforded, the rapidity with which the assembling can be done and the low cost of manufacture.

It will be understood that the invention herein described is applicable to spectacles as well as eyeglasses and the term "eyeglasses" used in the claims is intended to include spectacles as well.

Having described my invention, I claim:—

1. A pair of eyeglasses comprising the usual lenses having holes, a spring connecting said lenses, said spring being formed with two curves or volutes at the outer extremities of the bridge portion, said curves or volutes leading downward, then forward and upward and then backward to form a loop whose sides are in a plane substantially vertical and at right angles to the plane of the lenses, said curves or volutes terminating in straps which embrace the lenses from both sides and have perforations which register with the holes of the lenses, and screws passed through said perforated straps and the holes in the lenses for securing the parts together.

2. A pair of eyeglasses comprising the usual lenses, a spring connecting said lenses and having curves or volutes therein, wings at the extremities of said spring extending perpendicularly to the planes of the lenses, said wings being notched, and a pair of guards pivoted at points on the lenses and held in rigid relation by said notched wings.

3. A pair of eyeglasses comprising the usual lenses, each having a hole, a spring connecting said lenses and having curves or volutes therein and also having straps at its extremities adapted to embrace the lenses, said spring also having notched wings extending perpendicularly to the plane of the lenses and adapted to embrace the same, bolts passed through said straps and through the holes in the lenses, and guards secured by said bolts and passed through said notched wings by which they are securely held in place.

In witness whereof, I subscribe my signature, in the presence of two witnesses.

EMIL B. MEYROWITZ.

Witnesses:
  WALDO M. CHAPIN,
  WILLIAM DORMAN, Jr.